Patented July 16, 1935

2,008,346

UNITED STATES PATENT OFFICE 2,008,346

AZO-DYESTUFFS

Gérald Bonhôte, Basel, Switzerland, assignor to the firm Society of Chemical Industry in Basle, Basel, Switzerland No Drawing. Application December 21, 1934, Serial No. 758,703. In Switzerland January 23, 1934

6 Claims. (Cl. 260—95)

This invention relates to the manufacture of valuable new dyestuffs by coupling an arylide of the 2,3-hydroxynaphthoic acid with a diazotized base of the general formula

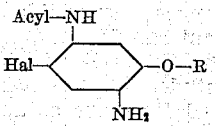

in which R is a benzene nucleus which may contain various substituents (for example, halogen, alkyl, alkoxy or N-acyl). The dyestuffs produced are blue-red to Bordeaux-red, garnet red and violet. The same tints are produced on the fiber by the dyestuffs and have excellent properties of fastness.

The diazotizing components here in question may be made, for example, quite generally, by acylation and reduction of condensation products obtainable from compounds such as 2-nitro-1,4-dihalogen-5-aminobenzene and phenol or a nuclear substitution product thereof, such as ortho-, para- or meta-cresol, ortho-, para- or meta-chlorophenol, a chlorocresol, a dichlorophenol, a mono-alkyl ether of hydroquinone or resorcinol or pyrocatechol, chloroguaicol or the like.

As acylating agents there may be named acetic anhydride, acetyl chloride, chloro-acetyl chloride, chlorocarbonic ester, propionyl chloride, benzoyl chloride, the chlorobenzoyl chlorides, phthalic anhydride, and the like.

The following examples illustrate the invention:—

Example 1

27.6 parts by weight of 4-chloro-2-amino-5-acetylamino-1,1'-diphenylether are diazotized in the usual manner. The clear diazo-solution is introduced into a solution consisting of 27.7 parts of 2,3-hydroxynaphthoic acid-para-toluidide, 60 parts of sodium hydroxide solution of 30 per cent. strength, 15 parts of sodium carbonate and 2000 parts of water. The dyestuff thus produced, very probably corresponding with the formula

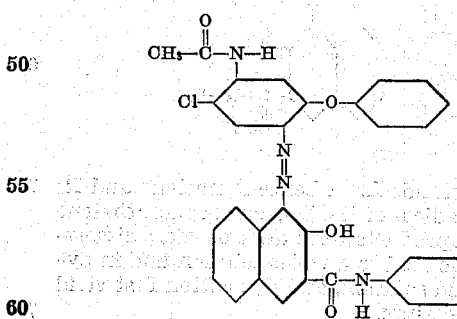

separates immediately in the form of a Bordeaux-red precipitate which is filtered and dried.

Example 2

Cotton yarn is impregnated with a grounding prepared by dissolving 7 grams of 2,3-hydroxynaphthoic acid-2-methoxy-5-chloranilide in 300 cc. of hot water with addition of 12 cc. of sodium hydroxide solution of 30 per cent. strength and 10 cc. of Turkey red oil, and diluting the whole to 1 liter. The yarn is then wrung out and developed in a neutralized solution containing 2 grams of diazotized 4-chloro-2-amino-5-acetylamino-1,1'-diphenylether per liter. There is produced a pure Bordeaux-red tint of excellent properties of fastness. The new dyestuff very probably corresponds with the formula

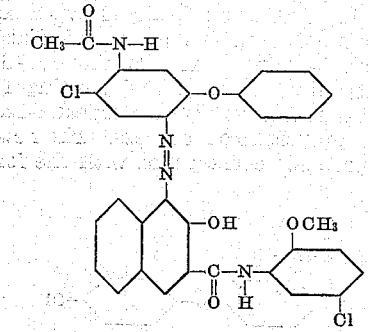

Like Bordeaux-red tints are obtained when there is used the para-chloranilide, the β-naphthalide, the para-phenetidide, the 2,4-dimethoxy-5-chloranilide, the 2-methoxy-5-methylanilide of 2,3-hydroxynaphthoic acid. Garnet red tints of like excellent properties of fastness are obtained when other arylides of 2,3-hydroxynaphthoic acid are used, for example, 5-chloro-2-toluidide, 3,4-dichloranilide.

Example 3

Cotton yarn is impregnated with a solution of 7 grams of 2,3-hydroxynaphthoic acid-para-chloranilide, 14 cc. of sodium hydroxide solution of 30 per cent. strength and 10 cc. of Turkey red oil per liter; it is then wrung out and developed in a diazo-solution neutralized with sodium carbonate and containing 2 grams of 4-chloro-2-amino-5-acetylamino-4'-methyl-1,1'-diphenylether per liter and is finally rinsed and soaped. There is obtained a pure Bordeaux-red tint of very good properties of fastness. The new dyestuff very probably corresponds with the formula

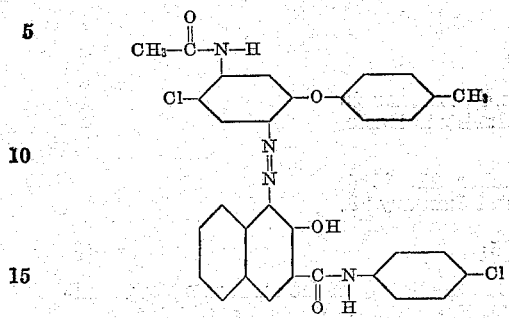

Like tints are obtained with other arylides of 2,3-hydroxynaphthoic acid, for example, with the anilide, the α- or β-naphthalide, the ortho-anisidide, the ortho-toluidide, the 2-methyl-4-anisidide, the 2,5-dimethoxyanilide of 2,3-hydroxy-naphthoic acid.

Garnet red tints are produced when 4- or 5-chloro-2-toluidide or meta-nitranilide of 2,3-hydroxynaphthoic acid is used.

*Example 4*

Cotton yarn is impregnated in 25 times its weight of a solution of 5 grams of 2,3-hydroxynaphthoic acid-2,5-dimethoxyanilide, 10 cc. of sodium hydroxide solution of 30 per cent. strength, 10 cc. of Turkey red oil, 5 cc. of formaldehyde solution of 40 per cent. strength per liter at 25-30° C.; it is then well wrung out and developed in a solution buffered with sodium acetate and containing 2 grams of diazotized 4',4-dichloro-2-amino-5-acetylamino-1,1-diphenylether per liter. Rinsing and soaping follow. There is obtained a very pure Bordeaux-red tint of excellent properties of fastness. The new dyestuff very probably corresponds with the formula

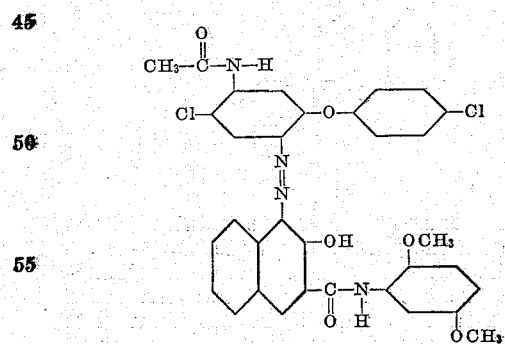

Similar Bordeaux-red tints are obtained when other arylides of 2,3-hydroxynaphthoic acid are used, for example, the 2-methoxyanilide, the 4-ethoxyanilide, the 2,4-dimethoxy-5-chloranilide, the 4-chloro-2-anisidide, the 2-chloranilide or the 2-naphthylamide of 2,3-hydroxynaphthoic acid.

*Example 5*

The material to be printed is foularded with an alkaline solution containing per liter 12 grams of 2,3-hydroxynaphthoic acid-2-anisidide. After drying, the material is printed with a printing colour containing 8 grams of diazotized 4-chloro-2-amino-5-acetylamino-4'-methoxy-1,1'-diphenylether per kilo. The pure Bordeaux-red color develops quickly and is very fast. The new dyestuff very probably corresponds with the formula

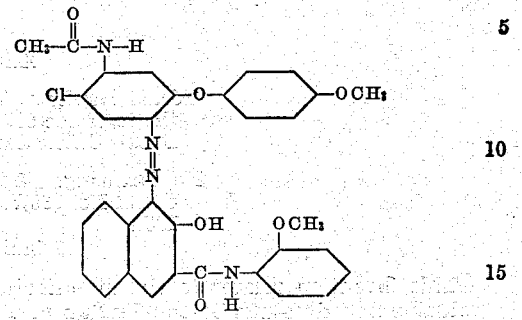

Similar tints are obtained, for example, by using the para-anisidide, the ortho-, meta- or para-toluidide, the para-phenetidide, the ortho-, meta- or para-chloranilide, the meta- or para-xylidide, the 2-methoxy-5-methylanilide or the 2,5-dimethoxyanilide of 2,3-hydroxynaphthoic acid. Garnet red tints are obtained when the meta-nitranilide of 2,3-hydroxynaphthoic acid is used.

Violet tints are obtained when, in the above examples, the acetyl-radical is exchanged for the benzoyl radical.

What I claim is:—
1. The dyestuffs of the general formula

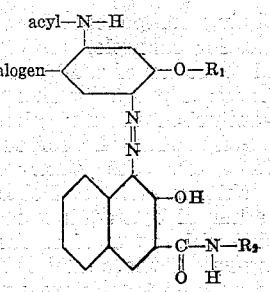

wherein R₁ stands for a benzene nucleus and R₂ for an aryl radical of the benzene or naphthalene series, which products form dark powders dissolving in sulfuric acid to a violet solution and in pyridine to a red solution, and dye cotton fast vivid violet to Bordeaux-red tints.

2. The dyestuffs of the general formula

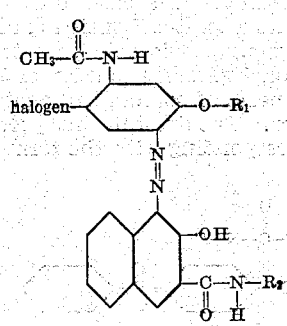

wherein R₁ stands for a benzene nucleus and R₂ for an aryl radical of the benzene or naphthalene series, which products form dark powders dissolving in sulfuric acid to a violet solution and in pyridine to a red solution, and dye cotton fast vivid Bordeaux-red tints.

3. The dyestuffs of the general formula

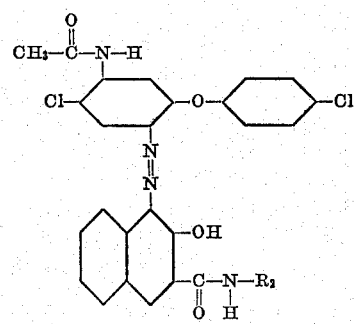

wherein R₂ stands for an aryl radical of the benzene or naphthalene series, which products form dark powders dissolving in sulfuric acid to a violet solution and in pyridine to a red solution, and dye cotton fast vivid Bordeaux-red tints.

4. The azo-dyestuff of the formula

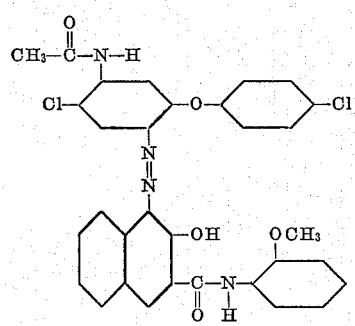

which product forms a dark powder dissolving in sulfuric acid to a violet solution and in pyridine to a red solution, and dyes cotton fast vivid Bordeaux-red tints.

5. The azo-dyestuff of the formula

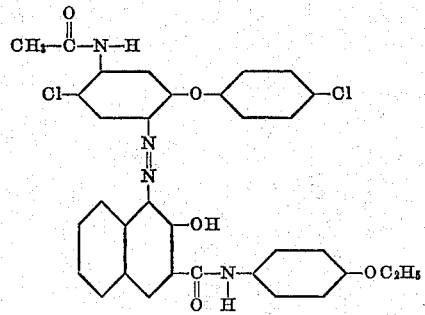

which product forms a dark powder dissolving in sulfuric acid to a violet solution and in pyridine to a red solution, and dyes cotton fast vivid Bordeaux-red tints.

6. The azo-dyestuff of the formula

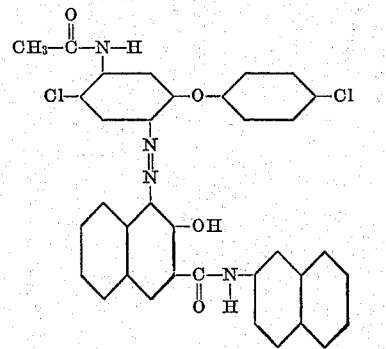

which product forms a dark powder dissolving in sulfuric acid to a violet solution and in pyridine to a red solution, and dyes cotton fast vivid Bordeaux-red tints.

GÉRALD BONHÔTE.